US010363797B2

(12) United States Patent
Ritzhaupt et al.

(10) Patent No.: US 10,363,797 B2
(45) Date of Patent: Jul. 30, 2019

(54) VEHICLE HEATER

(71) Applicant: BorgWarner BERU Systems GmbH, Ludwigsburg (DE)

(72) Inventors: Victor Ritzhaupt, Karlsruhe (DE); Alexander Dauth, Maulbronn (DE); Michael Luppold, Dettenheim (DE); Sisay Tadele, Leonberg (DE); Jörg Baginski, Remchingen (DE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 998 days.

(21) Appl. No.: 14/291,128

(22) Filed: May 30, 2014

(65) Prior Publication Data
US 2014/0355965 A1 Dec. 4, 2014

(30) Foreign Application Priority Data
Jun. 3, 2013 (DE) .................. 10 2013 105 686

(51) Int. Cl.
H05B 3/42 (2006.01)
B60H 1/22 (2006.01)
F24H 3/04 (2006.01)
F24H 3/10 (2006.01)
F24H 9/18 (2006.01)

(52) U.S. Cl.
CPC .......... B60H 1/2225 (2013.01); F24H 3/0429 (2013.01); F24H 3/0452 (2013.01); F24H 3/102 (2013.01); F24H 9/1872 (2013.01); H05B 3/42 (2013.01); H05B 2203/023 (2013.01)

(58) Field of Classification Search
CPC ....... B23K 9/173; B23K 35/383; B23K 9/325
USPC .... 219/74, 56, 73.2–76.1, 85.2, 145.1–146.5
See application file for complete search history.

(56) References Cited

U.S. PATENT DOCUMENTS

| 4,327,282 | A | 4/1982 | Nauerth |
| 5,377,298 | A | 12/1994 | Yang |
| 6,180,930 | B1 * | 1/2001 | Wu ........................ F24H 3/0429 219/530 |
| 2004/0169027 | A1 | 9/2004 | Bohlender et al. |
| 2005/0175328 | A1 * | 8/2005 | Pierron ................. B60H 1/2225 392/347 |
| 2009/0020515 | A1 | 1/2009 | Clade et al. |
| 2012/0061366 | A1 | 3/2012 | Kohl et al. |

(Continued)

FOREIGN PATENT DOCUMENTS

| CA | 2138868 C | 10/1998 |
| DE | 28 45 965 A1 | 4/1980 |
| DE | 30 42 420 A1 | 6/1982 |

(Continued)

Primary Examiner — Tu B Hoang
Assistant Examiner — Thomas J Ward
(74) Attorney, Agent, or Firm — Bose McKinney & Evans LLP

(57) ABSTRACT

The invention relates to a vehicle heater, comprising at least one pipe, which has a plurality of chambers, ceramic heating elements, which are arranged in the chambers, and contact plates, which rest against the heating elements in the chambers via a front side and face an upper side or underside of the chamber via a rear side, wherein at least two chambers of the pipe are separated by an intermediate wall, which runs from the upper side to the underside of these two chambers. The contact plates have a slit, in which the intermediate wall is arranged.

20 Claims, 2 Drawing Sheets

(56) References Cited

U.S. PATENT DOCUMENTS

2013/0188937 A1* 7/2013 Kominami .......... B60H 1/2221
392/360

FOREIGN PATENT DOCUMENTS

| | | |
|---|---|---|
| DE | 28 45 894 C2 | 8/1987 |
| DE | 10 2011 112 196 A1 | 3/2012 |
| DE | 102013105686.5 * | 6/2013 |
| EP | 1 452 357 A1 | 9/2004 |
| EP | 1 486 363 B1 | 8/2007 |
| EP | 1 884 383 A1 | 2/2008 |
| EP | 1 933 597 A1 | 6/2008 |
| EP | 1 933 598 A1 | 6/2008 |
| EP | 1 935 684 A1 | 6/2008 |
| EP | 2 293 648 A1 | 3/2011 |
| EP | 2 296 432 A1 | 3/2011 |
| EP | 2 397 788 A1 | 12/2011 |
| EP | 2 428 746 A1 | 3/2012 |

* cited by examiner

VEHICLE HEATER

RELATED APPLICATIONS

This application claims priority to DE 10 2013 105 686.5, filed Jun. 3, 2013, which is hereby incorporated herein by reference in its entirety.

BACKGROUND AND SUMMARY

The invention is based on a vehicle heater of the type generally known from DE 10 2011 112 196 A1.

Vehicle heaters in which heating elements are arranged in chambers of pipes have the advantage that the heating elements are well protected against ambient influences.

Higher heating powers are increasingly demanded by vehicle manufacturers, and increasingly smaller installation spaces are provided for vehicle heaters.

The present invention provides a way in which these demands can be met with a cost-effective vehicle heater.

Higher heating powers require a correspondingly larger space for ceramic heating elements, which are arranged in the chambers of pipes. A problem here is that the chambers cannot be enlarged arbitrarily, since an increasingly poorer thermal coupling of the heating elements to the pipe surrounding the heating elements occurs in larger chambers. For good thermal coupling, the pipes of vehicle heaters have to be compressed so that good thermal contact is provided between an upper side and underside of the chambers and the heating elements arranged therebetween. The wider the chambers, the greater is the risk that sufficient thermal contact will no longer be attainable in spite of compression.

With known vehicle heaters, an increased number of chambers is associated with the disadvantage of a correspondingly greater number of component parts and a correspondingly greater contacting effort. This disadvantage is overcome with a vehicle heater according to this disclosure in that the heating elements are contacted by contact plates having a slit, in which an intermediate wall separating two chambers of a pipe is arranged. With a vehicle heater according to this disclosure, a contact plate can thus contact heating elements in a plurality of chambers. The number of required component parts is thus advantageously reduced. A printed circuit board that carries a control circuit of the vehicle heater thus requires fewer contact points to contact plates, since a correspondingly smaller number of contact plates is sufficient. The contact plates may have, at one end, an extension that plugs into the printed circuit board.

The intermediate wall between two chambers of a pipe can be hollow, e.g., as is the case with the pipe of a vehicle heater illustrated in FIG. 4 of DE 10 2011 112 196 A1. The intermediate wall, however, preferably is not hollow, but solid.

As already mentioned, the thermal contact between a pipe and the heating elements arranged therein can be considerably improved by compressing the pipe. The direction of force during the compression is oriented perpendicularly to the plane of the contact plate or the contact plates. It is therefore advantageous for the intermediate wall to extend from the upper side to the underside of the chambers separated thereby. Here, the upper side and the underside of a chamber are to be understood to be the two sides that face the front side and rear side respectively of a contact plate arranged in the chamber. The front side of a contact plate is the side via which the contact plate contacts heating elements. In the case of a rectangular chamber, the upper side and underside thus extend parallel to the front side and the rear side of a contact plate.

In an advantageous refinement of this disclosure, a plurality of pipes, each of which has at least two chambers, are arranged side by side. Due to the use of a plurality of pipes, each of which has a plurality of chambers, a greater heating power can be achieved in a given volume. The pipes can be arranged at a distance from one another. Heat produced by the heating elements can then be transferred very efficiently to air flowing between the pipes. The pipes can be interconnected by heat transfer members, for example fins. Heat transfer elements are not absolutely necessary. Adjacent pipes preferably face one another via their upper sides and undersides. The flow resistance of the pipes can thus be minimized advantageously.

In accordance with an advantageous refinement of this disclosure, the pipes are flat pipes. Flat pipes have broad upper sides and undersides, which are interconnected via narrow sides. The intermediate wall or each intermediate wall extends from the upper side to the underside of the pipes. The flat pipes can have exactly two chambers, in which heating elements are arranged. If flat pipes having more than two chambers are used, the chambers are preferably arranged in a row beside one another.

If the pipes are used to connect the heating elements to earth, a single contact plate in a chamber is sufficient. In particular, with greater electric voltages, it is advantageous to arrange the heating elements between two contact plates, each of which is insulated with respect to the pipes.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DETAILED DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure. In this disclosure, terms such as "vertical," "parallel," "horizontal," "flat," round," "rectangular" and the like are used to describe the orientation, position or general shape of structural elements disclosed herein. As would be readily recognized by one of ordinary skill, it shall be understood for purposes of this disclosure and claims that these terms are not used to connote exact mathematical orientations or geometries, unless explicitly stated, but are instead used as terms of approximation. With this understanding, the term "vertical," for example, certainly includes a structure that is positioned exactly 90 degrees from horizontal, but should generally be understood as meaning positioned up and down rather than side to side. Other terms used herein to connote orientation, position or shape should be similarly interpreted. Further, it should be understood that various structural terms used throughout this disclosure and claims should not receive a singular interpretation unless it is made explicit herein. By way of example, the terms "pipe," chamber," heating element," to name just a few, should be interpreted when appearing in this disclosure and claims to mean one or more. All other terms used herein should be similarly interpreted unless it is made explicit that a singular interpretation is intended.

Figure 1:
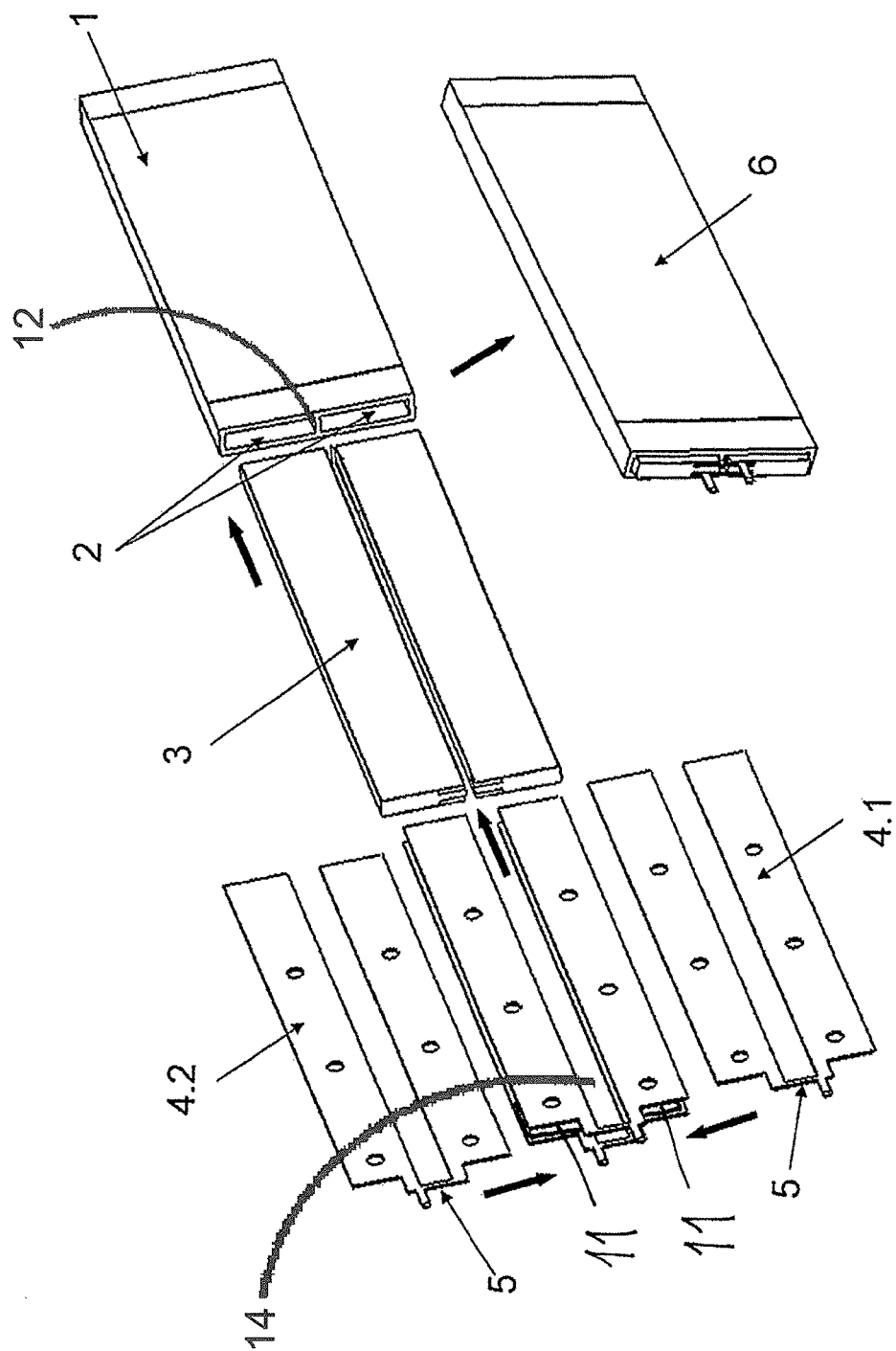
FIG. 1 shows the arrangement of contact plates in a heating pipe of a vehicle heater.

FIG. 1 schematically illustrates how different components are joined together to form a heating rod 6 of a vehicle heater. The heating rod 6 has a housing provided as a flat pipe 1, which has two parallel chambers 2 arranged side by side. The pipe 1 can be made of aluminium or an aluminium base alloy, for example. The chambers 2 are separated by an intermediate wall 12, which extends from a broad underside to a broad upper side of the flat pipe 1. The upper side and underside of the flat pipe 1 are interconnected by narrow sides.

Two contact plates 4.1, 4.2 are arranged in the flat pipe 1, and a plurality of ceramic heating elements 11 sit between the contact plates. The heating elements lie flat on the contact plates and may be PTC heating elements, for example based on barium titanate. Each contact plate 4.1, 4.2 contacts the heating elements via a front side and faces the upper side or underside of the chambers 2 via a rear side. Each contact plate 4.1, 4.2 is electrically insulated with respect to the flat pipe 1 by an insulating layer 3. The insulating layer 3 may be a strip made of an electrically insulating plastic or an electrically insulating ceramic, for example aluminium oxide. The edges and narrow sides of the contact plates 4.1, 4.2 are preferably also covered by the insulating layer 3, for example by winding an insulating strip around a composite formed from contact plates and heating elements.

The contact plates 4.1, 4.2 have a slit running on the longitudinal direction. The contact plates 4.1, 4.2 are introduced into the flat pipe 1 such that the intermediate wall of the flat pipe 1 is arranged in the slit, shown as slit 14 in FIG. 1. The two halves of the contact plates 4.1, 4.2 are connected at one end by a web 5, which carries an extension, preferably a pin-shaped extension, for electrical contact.

In the illustrated embodiment, the flat pipe 1 has exactly two chambers 2, in which heating elements are arranged. In order to increase the heating power, flat pipes with three or even more chambers arranged side by side can be used, in which the heating elements are contacted with contact plates having two or more slits running in the longitudinal direction.

Figure 2:
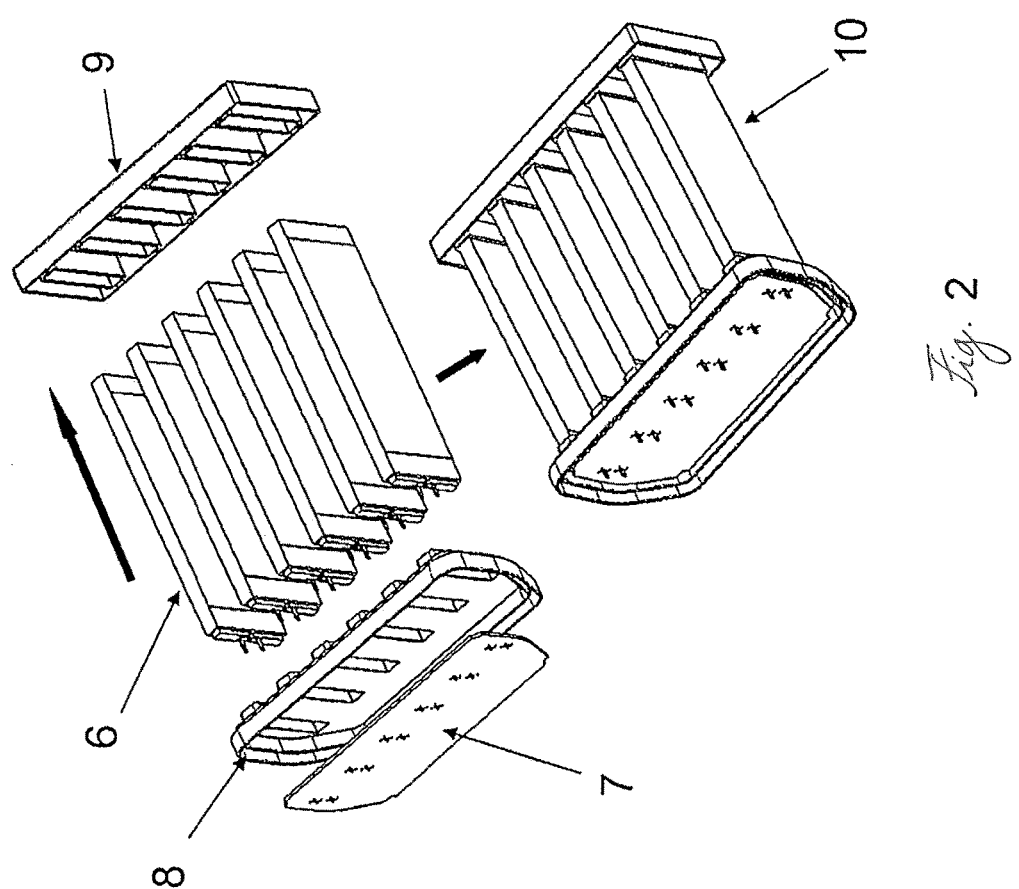
FIG. 2 shows the joining together of a plurality of pipes to form a vehicle heater.

FIG. 2 illustrates schematically how a plurality of heating rods 6 can be joined together to form a vehicle heater 10. Between adjacent heating rods 6 is a spacing, through which air to be heated can flow. Adjacent heating rods 6 are turned towards upper sides and undersides of the flat pipes. Air to be heated thus flows onto the flat pipes at a narrow side.

The heating rods 6 can be plugged via a rear end into a mount 9. A base 8 of a printed circuit board housing is fitted onto a front end of the heating rods, at which the contact plates protrude from the flat pipes. A printed circuit board 7 is placed onto the base 8 of the printed circuit board housing and has a plurality of contact openings. The extensions of the contact plates 4.1, 4.2 engage with these contact openings and thus produce electrical contact to the printed circuit board 7. The printed circuit board 7 carries a control circuit, which is not illustrated in FIG. 2 and, for example, may contain a transistor switch, by means of which the heating rods 6 can be activated individually.

The printed circuit board housing can be closed by a cover (not illustrated). The heating rods 6 can be provided with heat transfer elements, for example sheet metal lamellae that have been slid on.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE NUMBERS 1 flat pipe
2 chambers
3 insulating layer
4.1 contact plate
4.2 contact plate
5 web
6 heating rods
7 printed circuit board
8 base of the printed circuit board housing
9 mount
10 vehicle heater
11 heating element

What is claimed is:

1. A vehicle heater, comprising:
   a pipe having a plurality of chambers;
   each chamber having a ceramic heating element arranged therein;
   a contact plate configured for electrical contact, the contact plate having a front side contacting the heating elements and a rear side facing an upper side of the chambers or an underside of the chambers; and
   an intermediate wall separating at least two of the chambers, the intermediate wall extending from the upper side to the underside of the chambers, wherein the contact plate has a slit in which the intermediate wall is arranged.

2. The vehicle heater according to claim 1, wherein the contact plate has an extension at one end thereof that is inserted into a printed circuit board.

3. The vehicle heater according to claim 1, wherein the contact plate comprises two contact plates that are arranged in each chamber and the heating elements are arranged between the contact plates.

4. The vehicle heater according to claim 1, wherein the pipe comprises a plurality of pipes arranged side by side.

5. The vehicle heater according to claim 4, wherein an end of the pipes is inserted into a mount.

6. The vehicle heater according to claim 4, wherein the underside and the upper side of adjacent pipes face one another.

7. The vehicle heater according to claim 4, wherein an end of the pipes is inserted into a base of a circuit housing in which a control circuit is arranged.

8. The vehicle heater according to claim 7, wherein the control circuit is arranged on a printed circuit board.

9. The vehicle heater according to claim 1, wherein the pipe is flat.

10. The vehicle heater according to claim 1, wherein the intermediate wall is solid.

11. A vehicle heater, comprising:
- a pipe having two chambers and an intermediate wall separating the two chambers;
- each chamber having at least one ceramic heating element arranged therein; and
- a contact plate configured for electrical contact, the contact plate having a slit in which the intermediate wall is arranged, the slit having an open end and a closed end;
- wherein a front side of the contact plate contacts the heating elements in each of the two chambers and a rear side of the contact plate faces an upper side or underside of each of the two chambers.

12. The vehicle heater according to claim 11, wherein the contact plate comprises two contact plates and the heating elements are arranged between the two contact plates.

13. The vehicle heater according to claim 11, wherein the pipe comprises a plurality of pipes arranged side by side.

14. The vehicle heater according to claim 13, wherein an end of the pipes is inserted into a mount.

15. The vehicle heater according to claim 13, wherein the underside and the upper side of adjacent pipes face one another.

16. The vehicle heater according to claim 13, wherein an end of the pipes is inserted into a base of a circuit housing, in which a control circuit is arranged.

17. The vehicle heater according to claim 11, wherein the pipe is flat.

18. The vehicle heater according to claim 11, wherein the intermediate wall is solid.

19. The vehicle heater according to claim 11, wherein the two chambers comprise more than two chambers and the intermediate wall comprises a plurality of intermediate walls, each one of the intermediate walls separating two adjacent chambers.

20. The vehicle heater according to claim 19, wherein the slit comprises a plurality of slits, each one of said slits having a respective one of said intermediate walls arranged therein.

* * * * *